3,100,138
PRODUCTION OF HEAVY HYDROGEN
Gustav Schaurer, Assenheim, and Albert Heinzel, Ludwigshafen (Rhine), Germany, assignors to Badische Anilin- & Soda-Fabrik Aktiengesellschaft, Ludwigshafen (Rhine), Germany
No Drawing. Filed Nov. 15, 1960, Ser. No. 69,267
Claims priority, application Germany Nov. 18, 1959
4 Claims. (Cl. 23—210)

This invention relates to the production of heavy hydrogen. Heavy hydrogen (deuterium HD and $D_2$) and heavy water (deuterium oxide) have great importance in the nuclear reactor art. As regards their production, they are equivalent to each other because heavy water can readily be prepared from heavy hydrogen and vice versa. The real problem in the production of these substances lies in their separation from normal hydrogen or normal water.

For the recovery of heavy hydrogen a process is known according to which heavy hydrogen is separated from normal hydrogen by distillation. According to another known process, the separation of heavy hydrogen is carried out in the presence of catalysts by exchange reactions at varying temperatures.

Both of these methods have the disadvantage that the hydrogen used as initial material contains only a small amount of heavy hydrogen. Large amounts of hydrogen must therefore be worked up in order to obtain amounts of heavy hydrogen which are of interest industrially. For this reason the hydrogen required for the ammonia synthesis, before it is mixed with nitrogen and the mixture led over the ammonia catalyst, is often used as initial material for the recovery of heavy hydrogen.

It is an object of the present invention to provide a process for recovering heavy hydrogen during the ammonia synthesis. A further object of the invention is to use for the production of heavy hydrogen a hydrogen enriched in heavy hydrogen.

Another object of the invention is the production of heavy hydrogen from a gas mixture arising as a by-product in the synthesis of ammonia.

These and other objects are achieved by starting from an ammonia synthesis gas mixture which has been led several times over an ammonia catalyst and from which the content of ammonia, nitrogen and inert gases has been separated, and working up the hydrogen thus obtained to heavy hydrogen in the usual way. The ammonia synthesis gas mixture is a mixture of hydrogen (with the usual content of heavy hydrogen—about 0.02% by volume of the total hydrogen) and nitrogen, contaminated by varying amounts of rare gases, especially argon, and sometimes also methane and carbon monoxide (depending on the method used for preparing the hydrogen and for the preliminary purification of the gas). The impurities are described as inert gases. After having been led over the ammonia catalyst, the mixture contains additional amounts of ammonia which has been formed from part of the hydrogen and nitrogen. It has been found that the heavy hydrogen contained in hydrogen behaves in the ammonia synthesis like an inert gas and the residual gas, consisting substantially of methane and argon, becomes enriched in heavy hydrogen content when led several times over the ammonia catalyst.

The enrichment of heavy hydrogen which accompanies the ammonia synthesis becomes evident after passing the ammonia synthesis gas mixture ten times over the ammonia catalyst and subsequent separation of the ammonia formed, because the content of heavy hydrogen in the hydrogen increases to about 0.06% by volume, i.e., the concentration of the heavy hydrogen increases three times.

The enrichment of the heavy hydrogen in the end gases of the manufacture of ammonia depends on the operating conditions used (content of inert gases in the ammonia synthesis gas (fresh gas) and enrichment of the inert gases in the circulating gas when the ammonia synthesis gas is led in one or more circulations). The content of heavy hydrogen in light hydrogen may for example be increased to 30 to 40 times the normal content (from 0.02% by volume to about 0.6 to 0.8% by volume) by leading the gas mixture 150 to 200 times over an ammonia catalyst. The content of heavy hydrogen in the end gas increases at about the same rate as the content of inert gases. The enrichment is limited, when inert gases are present, by the permissible content of inert gases in the end gas, and by the loss of heavy hydrogen by the formation of heavy ammonia ($NDH_2$, $ND_2H$ and $ND_3$) which occurs upon high concentration of heavy hydrogen in the gas mixture. The permissible inert gas content is determined by the economical requirements of the ammonia synthesis. If however no importance is attached to the economy of the ammonia synthesis, the inert gases and therefore also the heavy hydrogen can be enriched more strongly than stated above, theoretically up to substantial impoverishment of the gas mixture in hydrogen and nitrogen.

It is convenient to use for the ammonia synthesis, gases which are substantially free from inert gases so that the enrichment of heavy hydrogen in the end gas is not limited by the content of inert gases. The content of inert gases in the fresh gas is about 0.0015% by volume or less. There are therefore used very pure gases, for example hydrogen produced by electrolysis and nitrogen obtained by air liquefaction, or the inert gases (except heavy hydrogen) are substantially removed from the synthesis gas prior to the synthesis, for example by washing with liquid nitrogen.

Under these conditions the heavy hydrogen can be enriched up to a content of a few percent in the light hydrogen of the end gases. The enrichment of the heavy hydrogen in the end gas is limited in this case by the beginning of the formation of ammonia from heavy hydrogen and nitrogen which sets in when the content of heavy hydrogen in the gas is too great and which leads to loss of heavy hydrogen.

It is advantageous to circulate the ammonia synthesis gas because in this way the enrichment of the heavy hydrogen for example to 40 times the normal content, i.e., from 0.02% by volume to 0.8% by volume, can readily be carried out industrially. It is convenient to use a plurality of circulations because in this way the enrichment of the heavy hydrogen is further intensified. After the synthesis gas has been led over the catalyst, the ammonia formed is substantially separated from the gas being circulated. This separation is however not complete. The circulating gas therefore usually contains a small proportion of ammonia. After a part of the circulating gas has been removed from circulation to separate the heavy hydrogen, the small amount of ammonia present in the gas withdrawn is conveniently removed by being washed out under pressure. This has the advantage that in this way the ammonia is substantially removed and that for the subsequent separation of the heavy hydrogen, if it is carried out under pressure, no compression of the gas is necessary.

For a further enrichment of the heavy hydrogen, the residual hydrogen enriched in heavy hydrogen originating from the ammonia synthesis can be used, after separation of ammonia, nitrogen and the inert gases and after having been mixed with an appropriate amount of nitrogen, as a fresh gas for the ammonia synthesis. Then a hydrogen containing still more heavy hydrogen can be prepared in the above-described manner from the circulated gas.

The following example will further illustrate this invention but the invention is not restricted to this example.

*Example*

A gas consisting substantially of nitrogen and hydrogen being supplied to the ammonia synthesis contains 0.02% by volume of heavy hydrogen in the hydrogen. The gas is partly reacted to ammonia with the aid of a catalyst at 320 atmospheres gage and at 500° to 550° C., the ammonia formed is separated and the residual gas again circulated after adding an amount of fresh gas corresponding to the amount of ammonia formed.

After this circulation has been repeated about 200 times, the gas continues 0.8% by volume of heavy hydrogen in the hydrogen, i.e. the content of heavy hydrogen in the gas has increased to 40 times the original content.

The hydrogen contained in the synthetic ammonia contains almost no heavy hydrogen. The ammonia separated in the liquid phase in the usual manner from the ammonia-containing gas behind the ammonia catalyst contains heavy hydrogen dissolved therein which, in the decompression which accompanies the separation of the ammonia from the residual gas, escapes together with the nitrogen, the inert gases and the light hydrogen. It is convenient also to use as initial material for the recovery of heavy hydrogen the hydrogen remaining after separation of the other gases from the hydrogen thus obtained.

We claim:

1. A process for the recovery of heavy hydrogen in the synthesis of ammonia from nitrogen and hydrogen gases which comprises reacting in a synthesis zone nitrogen gas and hydrogen gas containing a small amount of heavy hydrogen to form ammonia, separating the ammonia formed from unreacted, residual gases, said residual gases containing most of the heavy hydrogen of said hydrogen gas, replenishing said residual gases with fresh nitrogen and hydrogen gases containing small amounts of heavy hydrogen, feeding said replenished residual gases to an ammonia synthesis zone and reacting the nitrogen gas and the hydrogen gas in said zone to form ammonia, repeating the last two steps until the amount of heavy hydrogen in said residual hydrogen gas is at least about 0.06 volume percent, and thereafter separating heavy hydrogen gas from the remainder of the residual gases.

2. A process as claimed in claim 1 wherein said nitrogen gas and said hydrogen gas containing small amounts of heavy hydrogen are essentially free of other, inert gases.

3. A process as claimed in claim 1 wherein nitrogen gas and hydrogen gas containing small amounts of heavy hydrogen are dissolved in the liquid ammonia recovered from said synthesis zone, releasing the dissolved nitrogen, hydrogen and heavy hydrogen from the liquid ammonia at a lower pressure, and recycling said released nitrogen, hydrogen and heavy hydrogen to said synthesis zone.

4. A process as claimed in claim 1 wherein said replenished residual gases are recirculated through said synthesis zone at least 150 times before the accumulated heavy hydrogen gas is separated from the remainder of said residual gases.

References Cited in the file of this patent

UNITED STATES PATENTS 2,919,176  Gross ------------------ Dec. 29, 1959

FOREIGN PATENTS 807,803  Great Britain ----------- Jan. 21, 1959

UNITED STATES PATENT OFFICE

CERTIFICATE OF CORRECTION

Patent No. 3,100,138                        August 6, 1963

Gustav Schaurer et al.

It is hereby certified that error appears in the above numbered patent requiring correction and that the said Letters Patent should read as corrected below.

Column 3, line 14, for "continues" read -- contains --.

Signed and sealed this 21st day of April 1964.

(SEAL)
Attest:

ERNEST W. SWIDER

Attesting Officer

EDWARD J. BRENNER

Commissioner of Patents